June 3, 1930.  E. KAEMPF ET AL  1,761,565
CABLE
Filed May 25, 1929
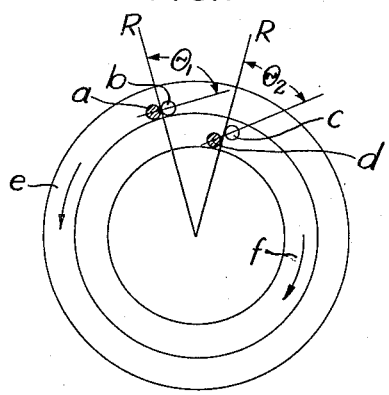
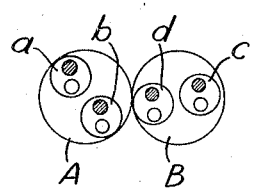
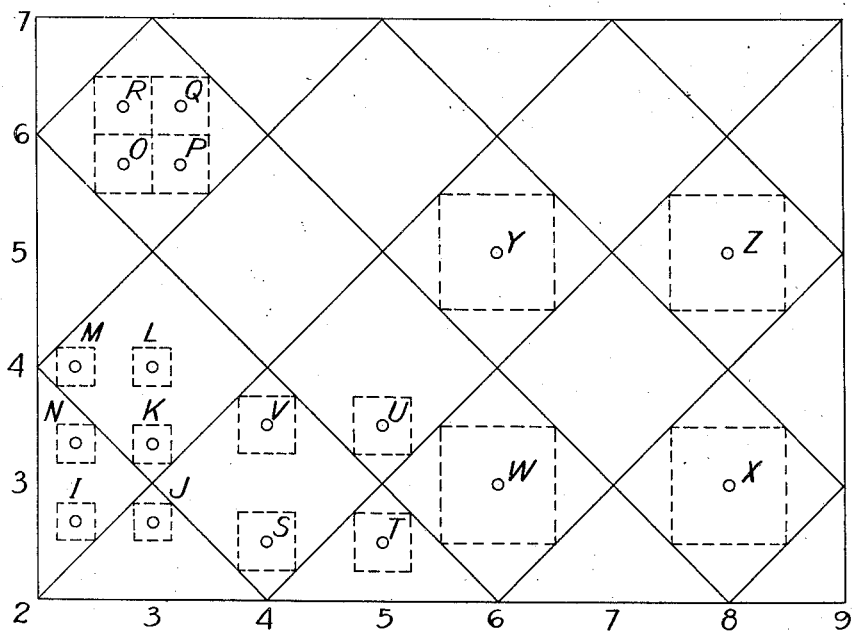
INVENTORS: E. KAEMPF
D. P. DALZELL
BY J. W. Schmied
ATTORNEY Patented June 3, 1930

1,761,565

UNITED STATES PATENT OFFICE

EMIL KAEMPF AND DONALD P. DALZELL, OF ALDWYCH, LONDON, ENGLAND, ASSIGNORS TO WESTERN ELECTRIC COMPANY, INCORPORATED, OF NEW YORK, N. Y., A CORPORATION OF NEW YORK

CABLE

Application filed May 25, 1929, Serial No. 365,846, and in Great Britain May 22, 1928.

In electrical transmission through cables consisting of more than one circuit difficulties are encountered owing to mutual interference between the various circuits.

This interference is due to inequalities in the electrical properties of the two sides of one electrical circuit causing electrical influences which unequally affect the two sides of another electric circuit.

These inequalities are due to defects in manufacture and raw materials and to the fact that the two sides of a circuit are necessarily distinct and are, therefore, not generally situated similarly with respect to other circuits.

The effects of differences in the spacial relations of the two sides of a circuit to another circuit or conductor are known commonly to be frequently reduced by twisting together the two sides of a circuit, by twisting circuits together or by some other method of transposition whereby one or more circuits are assembled or twisted into a stranding unit; further, two or more stranding units of the same or different types are assembled and then included in layers consisting each of helically applied stranding units of the same type or of different types to make a cable core. One or more cable cores may compose a cable unit.

The present invention concerns a cable in which such interferences approach a minimum and consists in a cable in which the interference between circuits in the cable due to differences in the relation of two sides of a circuit to another circuit or to the regular and repeated recurrence of such differences may be largely avoided by the use of a definite system or systems of twisting and stranding.

For simplicity of exposition the definitions as herein understood are given for a single cable core containing several layers each composed of pair circuits consisting of two similar insulated conductors. The term "stranding torsion" of each of the several layers is given to the number of revolutions, whether right or left, and fractions of a revolution whether right or left severally and simultaneously executed by those layers in unit length of the cable core, measured axially along the core. The term "twisting torsion" of any one pair is given to the expression obtained by measuring the axial length of core between two successive appearances on the outside of its own layer of one and the same wire of that pair and taking the reciprocal of the number expressing this distance. This axial length is also called the twist length or length of twist. In both definitions the same method and units of length measurement are employed.

The definition of twisting torsion may be suitably modified to apply to circuits contained in stranding units consisting of more than two wires, such, for example, as a quad. The twisting torsion of one pair of a quad about another pair of the quad is the expression obtained by measuring the axial length of core between two successive appearances on the outside of its own layer of one and the same pair of the quad and taking the reciprocal of the number expressing this distance.

In the case of cables consisting of quadded stranding units many empirical rules are known and employed for the choice of one or more of the torsions in a stranding unit when the remaining torsion or torsions are given or when some relation or relations between the several torsions are given or in some similar sets of circumstances. Any such rules may reduce interference between the several circuits of a stranding unit, but is ineffective in the reduction of interference between circuits of different stranding units. The use, however, of dissimilar stranding units, (e. g. units of different twisting torsions) in a pair of stranding units adjacent in the same layer or the use of dissimilar stranding units for a pair of stranding units, one of which is in the layer adjacent to that of the other, are well known devices for the reduction of interference between circuits in pairs of stranding units.

According to the present invention a certain system of torsions for the pairs of a pair cable, for the phantoms of a quadded cable, for the star quads of a star-quad cable, or for the stranding units composed of pairs of multiples of pairs in any other type cable is used with given stranding torsions and in the case of quadded cable a certain system of pair torsions is used with given quad torsions.

The drawing gives diagrams used to explain the invention.

Fig. 1 is a diagram of two pairs of conductors in a cable having stranding units (in this case, pairs) applied in layers, the lay being opposite in the adjacent layers;

Fig. 2 shows a plot of the equation or, rather, set of equations, $n_1 \pm n_2 = 2N$, which equation is derived hereinafter, with indications of preferred and other suitable specific torsions (defined hereinafter), and indications of permissible manufacturing variations; and Fig. 3 is a diagram useful for explaining the preferred relation of the twisting torsions of pairs in two quads to the twisting torsions of the quads themselves.

In Fig. 1 the conductors $a$ and $b$ form a pair $a, b$, and the conductors $c$ and $d$ form a pair $c, d$. The conductors of pair $a, b$, which lie in one layer are twisted together with a twist length $L_1$ measured axially of the cable, whilst the conductors of pair $c, d$, lie in an adjacent layer and are twisted together with a twist length $L_2$. A twist length is the axial length of a complete twist of the conductors about one another. It is convenient to refer to the twisting torsion of a pair hereinbefore defined as $\frac{1}{L}$ as the pair torsion "$t$". The twisted pairs are stranded into the cable and the stranding of the pairs, $a, b$, and $c, d$, are in the directions $e$ and $f$ respectively. In the position shown in Fig. 1 the pairs $a, b$, and $c, d$, present a certain mutual aspect and this precise aspect will recur at other parts of the cable when the pairs occupy a precisely similar relative position. It may be convenient in practice to use the same stranding lay S for the two layers containing $a, b$, and $c, d$, and under such conditions the pairs $a, b$, and $c, d$, will occupy similar relative positions (except as regards the pair twists) on the other side of the cable at an axial distance $\frac{S}{2}$ from the position shown.

The position of the line joining the centers of the pair of conductors $a$ and $b$ with respect to the line joining the center of that line to the center of the cable, i. e., a radius R, may be represented by the angle $\theta_1$. Similarly $\theta_2$ represents a similar angle dependent in magnitude upon the position of conductors in the pair $c, d$. We may term the difference $\theta_1 - \theta_2 = \phi$ so that the value of $\phi$ depends upon the mutual disposition of the two pairs when they are near together at a certain position as shown in Fig. 1. Now, let the value of $\phi_1$ depend upon their mutual disposition when they are near together again at another position. At the next position on the other side of the cable at an axial distance $\frac{S}{2}$ from the first position at which the pairs are together the angular disposition of the conductors $a$ and $b$ may be represented by $t_1 \frac{S}{2} + \theta_1$ and $(\pm t_2 \frac{S}{2} + \theta_2)$ and the relative angular disposition is $$(t_1 \frac{S}{2} + \theta_1) - (\pm t_2 \frac{S}{2} + \theta_2) = \phi_1.$$

The significance of the angular values such as $\phi$ and $\phi_1$ will be more readily perceived if they are considered as numbers representing proper or improper fractions of revolutions. The repetition of the relative spacial position of the pairs shown in Fig. 1 will occur when $\phi_1 - \phi = N$ where N is a whole number, and therefore when $t_1 \frac{S}{2} \pm t_2 \frac{S}{2} = N$, any integer.

If we term $tS$ the specific pair torsion ($n$) i. e. the ratio of the torsion of a pair to the stranding torsion we may express the critical conditions to be avoided as $n_1 \pm n_2 = 2N$.

This equation when plotted gives the family of straight lines illustrated in Fig. 2. By choosing points which lie most remote from these lines ideal twists may be chosen for the pairs, so that a minimum of disturbance is produced, for example a suitable choice of twists for $a, b$, and $c, d$, would be $n_1 = 1, 3, 5, 7$, etc. and $n_2 = 2, 4, 6, 8$, etc. These give ideal conditions but in practice it may not always be convenient to use them and perfectly satisfactory results can be obtained by using values within the following limits, for example $n_1 = 1 \pm 1/2$, $3 \pm 1/2$, $5 \pm 1/2$, and $n_2 = 2 \pm 1/2$, $4 \pm 1/2$, $6 \pm 1/2$, etc. or expressed in words the specific torsions of the pairs in one layer must differ from some one of the numbers $2n$ where $n$ is an integral number by less than 1/2 and the specific torsions of the pairs in an adjacent layer must differ from some one of the numbers $2n+1$ where $n$ is an integral number by less than 1/2.

In the above example we have taken the stranding torsion to be the same for layers containing both units $a, b$, and $c, d$. If different stranding torsions are used the above principle of determining suitable torsions remains unchanged except that for the stranding torsion the mean value of the two is taken.

In Fig. 2 we have shown how points lying at the centre of the square give ideal choice and represent the torsions which give minimum of interference. These torsions may be termed "ruthless torsions" since they give an absolute minimum of interference, disregarding extraneous influences. Other choices which give reasonable values of interference are also apparent. Thus, W, X, Y, Z represent ruthless torsions, whilst, S, T, U, V, give another quite suitable choice, O, P, Q, R, is another satisfactory relationship of torsions and I, J, K, L, M, N, belong to a set of torsions giving a reasonably small value of interference. In all cases the points representing the chosen torsions lie remote from the lines, and the points representing ruthless torsions are most suitable. Variations from these points within the given limits may be required by the machines used in manufacture. The maximum permissible limits for each case are indicated by the dotted squares surrounding each point.

By building a cable on the principles of this invention not only is the interference between quads in adjacent layers reduced to a minimum, but also the interference between adjacent quads in the same layer is to a considerable extent reduced.

In order to reduce phantom to pair unbalance in adjacent quads of a layer, the principle above derived may be further developed. In Fig. 3, A and B represent adjacent quads of a layer in a cable, quad A comprises pairs $a$, $b$, and quad B comprises pairs $c$, $d$. It is necessary to determine a suitable relation between the quad twist (twist of one pair about the other pair) of B, the pair twist (twist of one conductor about the other) of $d$ and the quad twist of A.

More particularly, referring to Fig. 3, $a$ represents a twisted pair, $b$ another twisted pair and the pairs $a$ and $b$ are twisted together in accordance with a quad twist to form a quad. Pair $c$ is also twisted together, pair $d$ is twisted together and pairs $c$ and $d$ are given a quad twist to form a quad. Pair $a$ constitutes a circuit, pair $b$ constitutes a circuit, pair $c$ constitutes a circuit and pair $d$ constitutes a circuit. Pairs $a$ and $b$ together form a phantom circuit and pairs $c$ and $d$ a phantom circuit. In considering the interfering effect of the phantom circuit of quad A upon the circuit of pair $d$ the pair twists of the members of pairs $a$ and $b$ about each other may be neglected and their twisting progression according to the quad twist only need be considered. In other words, the pair $a$ may be considered as one conductor represented by a circle in the diagram and the pair $b$ another conductor represented by another circle. These pairs and hence the conductors which they represent, twist about each other with a quad twist in accordance with well known methods of construction.

In considering the effect of the phantom circuit of quad A upon the circuit of pair $d$ we have three angular progressions to consider and these are analogous to the progressions involved in twisted pairs lying in adjacent layers. The analogies are as follows:— The angular progression of the pair twist of one of the twisted pairs in a layer (Fig. 1) corresponds to the angular progression of the pair twist of the pair $d$ in a quad (Fig. 3); the angular progression of the pair twist of a twisted pair in an adjacent layer (Fig. 1) corresponds to the angular progression of the quad twist of an adjacent quad such as A (Fig. 3); and the relative angular progressions of the stranding lays of the two pairs in adjacent layers (Fig. 1) corresponds to the angular progression of the quad twist of the quad including the pair such as quad B (Fig. 3). Since the situations are analogous, similar equations may be used. Thus if we take the equation $$t_1 \frac{S}{2} \pm t_2 \frac{S}{2} = N$$

and substitute $\frac{1}{L_3}$ for $t_1$, $\frac{1}{L_4}$ for $t_2$, and T for $\frac{S}{2}$ we get $$\frac{T}{L_3} \pm \frac{T}{L_4} = N.$$

in which $\frac{1}{L_3}$ is the reciprocal of the axial length of a complete twist of the pair $d$; $\frac{1}{L_4}$ is the reciprocal of the axial length of a complete twist of quad A, and T is the axial length of a complete twist of quad B. These substitutions are valid because $t_1$ and $\frac{1}{L_3}$ are reciprocals of a twist length, $t_2$ and $\frac{1}{L_4}$ are likewise reciprocals of a twist length, and T and $\frac{S}{2}$ are axial lengths in which interfering members repeat their nearest approach to one another. T is used instead of $\frac{S}{2}$ because, whereas in the case of twisted pairs in adjacent layers, the pairs approach each other twice in a complete strand about the cable, the pair $d$ can approach the quad A only once in a complete revolution of the quad B in accordance with the quad twist. Since the quads A and B are adjacent, the variation in spacial relation of the pair $d$ to the phantom circuit of quad A between their minimum distance apart and their maximum distance apart is not great. Consequently the interfering conditions expressed by the equation $$\frac{T}{L_3} \pm \frac{T}{L_4} = N$$

are not notably detrimental for values of N except when $N = \pm 1$. Consequently N may be given the value ±1 and the equation reduces to $$\frac{1}{L_3} \pm \frac{1}{L_4} = \pm \frac{1}{T}$$

$\frac{1}{L_3}$ is the torsion of a pair of one quad, $\frac{1}{L_4}$ is the quad torsion of an adjacent quad, and $\frac{1}{T}$ is the quad torsion of the quad including the pair.

Expressing the implication of the equation in words, the pair torsion of a pair should approach neither the sum nor the difference of the quad torsions of a quad containing that pair and an adjacent quad. If the approach does not fall between 4/5 and 6/5 of the sum or the difference, the interference between the pair in one quad and the phantom circuit in an adjacent quad is not unduly large.

As hereinbefore defined, a stranding unit comprises one pair, or a multiple of pairs twisted together before being stranded upon the cable.

What is claimed is:

1. A cable comprising stranding units contained in adjacent layers in each of which are at least two dissimilar stranding units, the specific torsion of each of the two units in one layer differing from one of the numbers, 2n, by less than one-half, and the specific torsion of each of the two units in the other layer differing from some one of the numbers, 2n+1, by less than one-half, where n is any integral number.

2. A cable according to claim 1 in which some of the stranding units are quads and the torsion of a pair in one quad is not between 4/5 and 6/5 of the sum or difference of the quad torsion of that quad and the quad torsion of an adjacent quad.

3. A cable according to claim 1 in which some of the stranding units are quads and the quad and pair torsions of a substantial majority of adjacent quads are such that the torsion of a pair in one quad does not fall between 4/5 and 6/5 of the sum of the quad torsions of that quad and an adjacent quad.

4. A cable comprising conductors arranged in stranding units contained in layers in each of which are at least two dissimilar stranding units, characterized in this, that a substantial majority of the units in adjacent layers, have twisting torsions reducing the recurrence of the precise relative special position of two mutually interfering units as presented at any particular cross-section by choosing twisting torsions which avoid the conditions $$\frac{S}{L_1} \pm \frac{S}{L_2} = 2N$$

where S is the common or mean stranding lay, $L_1$ = the length of twist of one unit $L_2$ = the length of twist of the unit interfering therewith N is an integral number.

5. A cable comprising conductors arranged in stranding units which include pairs in which a substantial majority of the pairs have twisting torsions such that the recurrences of the identical pair relative position of any particular pair to a stranding unit adjacent to it at any particular cross-section are reduced by choosing twisting torsions which avoid the conditions $\frac{1}{T} = \pm \frac{1}{L_3} \pm \frac{1}{L_4}$, where T is the length of twist of a stranding unit including the pair in question, $L_3$ is the length of twist of the pair, and $L_4$ is the length of twist of any stranding unit adjacent to that containing the pair.

In witness whereof, I hereunto subscribe my name this 25th day of April, 1929.

EMIL KAEMPF.

In witness whereof, I hereunto subscribe my name this 17th day of April, 1929.

DONALD P. DALZELL.